United States Patent
Roplekar et al.

(10) Patent No.: US 12,016,279 B2
(45) Date of Patent: Jun. 25, 2024

(54) PLANT SUPPORT WITH A NOVEL CONNECTOR

(71) Applicants: Jayant K Roplekar, Peoria, IL (US); Srujan J Roplekar, Peoria, IL (US)

(72) Inventors: Jayant K Roplekar, Peoria, IL (US); Srujan J Roplekar, Peoria, IL (US)

(*) Notice: Subject to any disclaimer, the term of this patent is extended or adjusted under 35 U.S.C. 154(b) by 327 days.

(21) Appl. No.: 17/567,645

(22) Filed: Jan. 3, 2022

(65) Prior Publication Data

US 2023/0210061 A1    Jul. 6, 2023

(51) Int. Cl.
*A01G 9/12* (2006.01)
*B23B 31/113* (2006.01)

(52) U.S. Cl.
CPC .............. *A01G 9/12* (2013.01); *B23B 31/113* (2013.01)

(58) Field of Classification Search
CPC ........ A01G 9/102; A01G 9/106; A01G 9/108; Y10T 403/7007; Y10T 403/7052; Y10T 403/7056; Y10T 403/7058; A63H 33/10
See application file for complete search history.

(56) References Cited

U.S. PATENT DOCUMENTS

| | | | | |
|---|---|---|---|---|
| 1,446,868 A | * | 2/1923 | Baker | A63H 33/107 446/124 |
| 3,851,601 A | * | 12/1974 | Davis | F16B 12/02 403/171 |
| 5,711,107 A | * | 1/1998 | Louisiana | A01G 9/12 47/45 |
| 6,095,713 A | * | 8/2000 | Doyle | F16B 7/04 403/103 |
| 7,478,501 B2 | | 1/2009 | Wilbanks, Jr. et al. | |
| 7,735,259 B2 | | 6/2010 | Rich et al. | |
| 8,567,120 B2 | | 10/2013 | Davis et al. | |
| 8,813,422 B1 | | 8/2014 | Laudenklos | |
| 9,578,815 B2 | | 2/2017 | Montagano | |
| 9,717,188 B2 | | 8/2017 | Legus et al. | |
| 9,801,347 B2 | | 10/2017 | Montagano | |
| 10,219,445 B2 | | 3/2019 | Montagano | |
| 10,757,868 B2 | | 9/2020 | Montagano | |
| 2007/0281579 A1 | * | 12/2007 | Sambenedetto | A63H 33/067 446/124 |
| 2018/0359960 A1 | * | 12/2018 | MacDonald | A01G 9/12 |
| 2023/0114267 A1 | * | 4/2023 | Wilson, IV | A63H 33/044 446/120 |

FOREIGN PATENT DOCUMENTS

KR          102277448 B1 *  7/2021

* cited by examiner

*Primary Examiner* — Joshua T Kennedy

(57) ABSTRACT

A connector assembly for a plant support structure comprising of a hub, a compressible sleeve and a second piece engaged with the hub is disclosed. The hub contains a pass through hole at the center to allow passage of a support member. It also contains receptacles perpendicular to the axis of the central pass through hole to receive the cross members of the plant support structure. The reversible engagement features utilized to secure hub to the second piece allow vertical repositioning of the cross members supporting multiple plants.

5 Claims, 4 Drawing Sheets

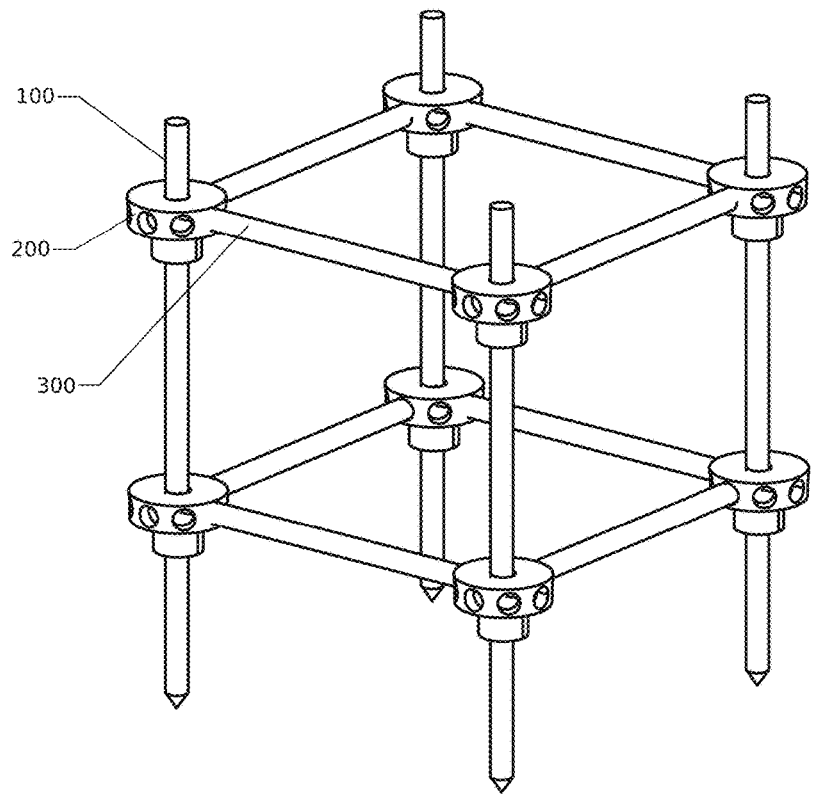
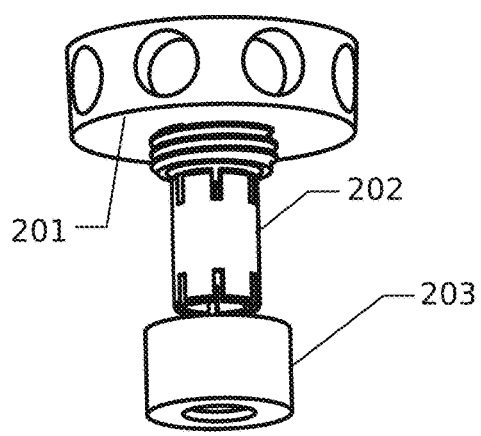
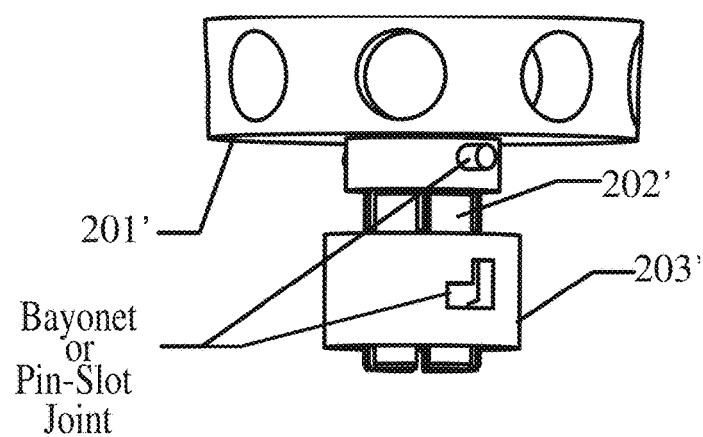
Figure 2
Figure 3A
Figure 3B
Bayonet or Pin-Slot Joint

PLANT SUPPORT WITH A NOVEL CONNECTOR

BACKGROUND OF THE INVENTION

The present invention is related to the field of horticulture and, more particularly, to an adjustable system for supporting growing plants, such as tomatoes and peppers and various other plants whose stalks or branches have a tendency to bend or break due to the weight of the vegetable, fruit or flower growing thereon.

Many plants benefit from an appropriately sized support framework by reducing shear stress that can break the plant's stalk or branches. This can also help keep the fruits or produce from touching the ground, maintaining the quality of the produce.

This framework can be as simple as a vertical pole to which the plant is tied, or can be much more complex, with crossbars and upright ribs that form a latticework or wire cage to support the plant. One of the common support structures used for this purpose is pre assembled wire cages. These cages are awkward to use and take significant space to store during the off-season. Typically, they must be placed around the plant at an early stage in its growth; once the plant outgrows the cage, the effectiveness of the support is limited and replacement with a bigger cage is cumbersome and more than likely to destroy branches and produce during replacement. The typical result of the inconveniences associated with adjusting these supports is a lack of optimal support during the most productive phases of plant growth.

PRIOR ART

To overcome the above limitation of a fixed form plant support such as a pre-assembled cage, multiple approaches for extensible plants supports have been proposed in the literature and commerce. The following references describe some of these approaches.

Widely marketed plant supports consist of stakes made from plastic, fiberglass or metal rods coated with plastic. The stakes are tied together with tape or twist ties or in some cases special connectors as described in following sections. There have been other methods invented to form plant supports. For example, U.S. Pat. No. 8,567,120 B2 to Davis et al. describe an invention with a solid, cylindrical base with holes to accept posts and associated tier rings. A cover may also be provided to transform the base into a miniature hot house. Adaptability is achieved by changing the height by stacking additional elements. A similar invention, U.S. Pat. No. 8,813,422 B1 to Laudenklos, describes a structure with a vertical post driven into ground and vertically spaced-apart fixed cross section support rings, whose vertical spacing can be changed by where they are fastened to the vertical post. U.S. Pat. Nos. 9,801,347 B2 and 10,757,868 B2 to Montagano show bracing members as circular rings of different diameter in a tier structure formed by attaching them at the outer periphery with support rod with a fastener.

U.S. Pat. No. 7,735,259 B2 to Rich et al. describes an adjustable plant stake assembly having cross braces, stake anchors and couplers that can be used with conventional plant stakes.

U.S. Pat. No. 7,478,501 B2 to Wilbanks Jr. et al. describes a modular plant support system for supporting growing plants of stacked interlocking layers of cylindrical rings. The split rings are flexible and modular and configured to interconnect end to end so as to form a plant support layer of any reasonable diameter by coupling multiple sections. The layers of the plant support stand may be stacked and interconnected to form a plant support system of a height suited to support the requirements of the plant.

U.S. Pat. Nos. 9,578,815 B2 and 10,219,445 B2 to Montagano describe a modular pole for horticultural and agricultural use, pole sections and connector pins for assembling the pole, and methods for assembling the pole. In some embodiments a connector pin is inserted into end sockets in opposed pole section ends and in other embodiments the ends are held onto the connector pin by a fastener which may comprise a clip or a threaded sleeve.

U.S. Pat. No. 9,717,188 B2 to Legus et al. describes collapsible plant support that includes a collapsible coil, which in some embodiments can serve as a fluid network as well.

Many of the existing solutions for adaptable plant supports provide flexibility only in the height direction. They tend to utilize a fixed section to provide the support which is not always optimal for most plants. The number of elements needed to accomplish the task make the cost and effort required to reconfigure significant. What is needed is a low cost connector element, that will allow use of existing general purpose garden stakes and rapid adaptability of the support for a variety of plants, which upon the end of the season, can be easily stored with minimal space usage.

It is an object of this invention to create an adaptable support system for plants that is low cost, able to support significantly higher plant weight than prior art associated commercially popular garden stakes. It is further an object of this invention to be very quick to assemble as well as disassemble and hence be adjustable multiple times during the growing season, as well as to be easy to store at the end of season. A pivotal element of this invention is a connector assembly which creates a significant gripping force on the garden stakes commonly used in gardening. This connector element, in one embodiment, can be easily assembled at various heights using a threaded joint. The various configurations enabled by this connector assembly, in conjunction with common purpose garden stakes to form the embodiments described in this application, are useful novelties provided by this invention.

Other objects and advantages of the present invention, such as being able to form a lattice or trellis for a vine, or to add a mid-support based on the needs of the plant growth patterns of a particular season, would be apparent from the drawings and detailed description in the following sections.

BRIEF DESCRIPTION OF DRAWINGS

For a more complete understanding of the invention, references are made to the following description and accompanying drawings:

FIG. 2 is an example of framework formed by using invented connector assembly.

FIG. 3A is the exploded pictorial view of the connector assembly in the preferred embodiment of threaded joint to connect the assembly, FIG. 3B shows embodiment of the connector assembly with a Bayonet or a Pin-Slot joint.

DETAILED DESCRIPTION OF THE INVENTION

The arrangement in FIG. 2 shows an exemplary arrangement enabled by the current invention. In FIG. 2, one sees a typical garden stake Element 100, and the invented connector assembly, Element 200, forming a frame work along with a cross-member Element 300. Element 300, the cross-member, can be the same as Element 100, but need not be. By having multiple layers of connector assemblies and cross-members, one can form a fairly sturdy support structure to support the plant. Since repositioning the support height of each horizontal cross section is simple, as described in the next section on the operation of the connector assembly, it forms a convenient adaptable plant structure.

FIG. 3A Illustrates the exploded view of the connector assembly, where Element 201 in the current embodiment is the threaded male with a through hole of a predetermined dimension to accommodate the stake 100 along its axis. It also has a inner contour to capture a sleeve 202, which has flexibility such that it will grip on the stake only in the assembled form. The Element 203 shown in FIG. 2 is a female threaded element which, on its inner surface also has a contour to apply pressure on the flexible sleeve as it is assembled against element 201. FIG. 3B shows an embodiment utilizing a bayonet or "pin and groove" joint, instead of a threaded joint to engage Elements 201 and 203 together, a familiar approach to those skilled in the art. This second approach has a potential to reduce variability in the amount of twist a user imparts during assembly, and also to simplify manufacturing of the connector assembly.

Figure 1:
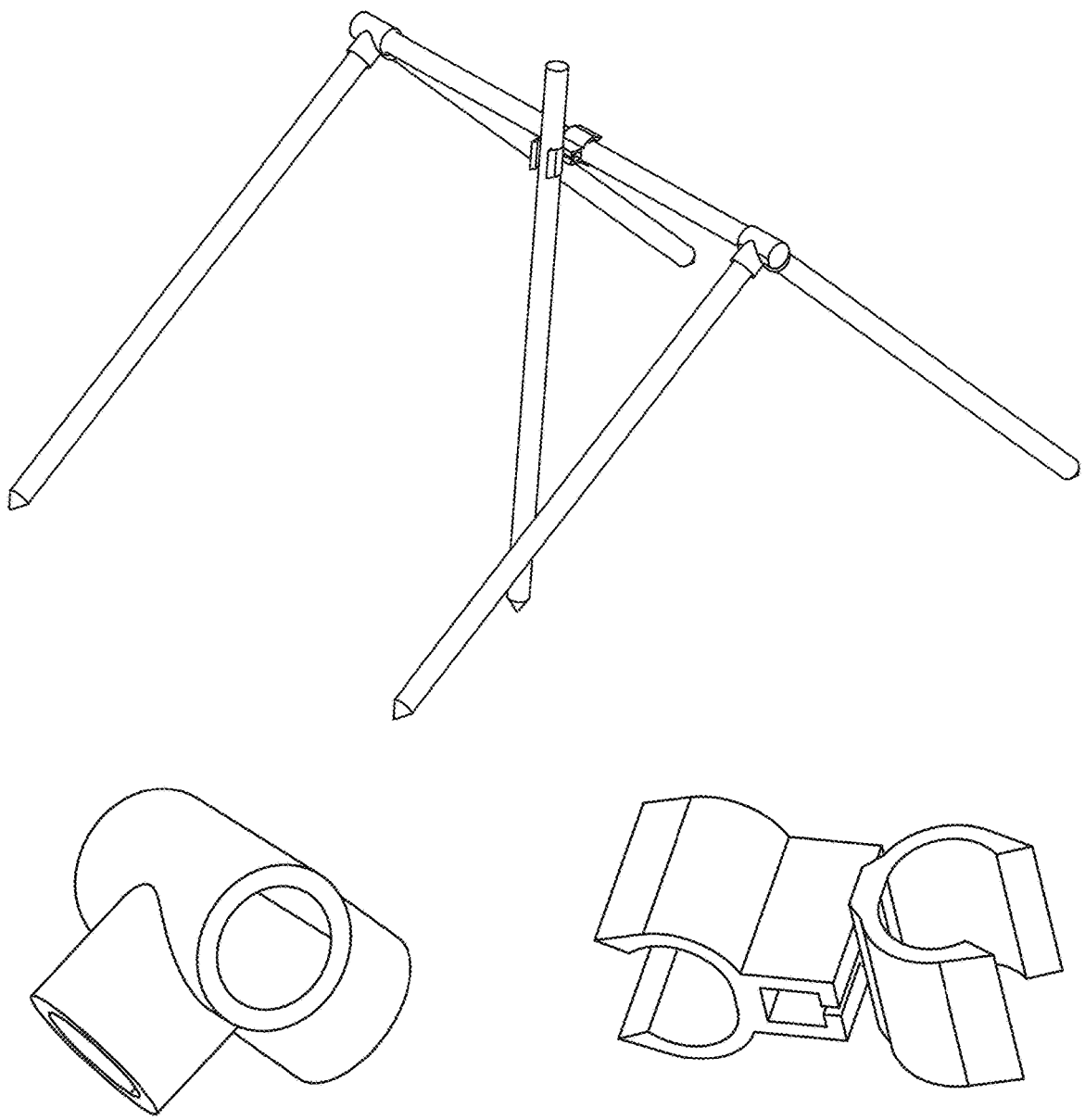
FIG. 1 shows example prior art elements marketed with garden stakes for plant support.
Figure 4:
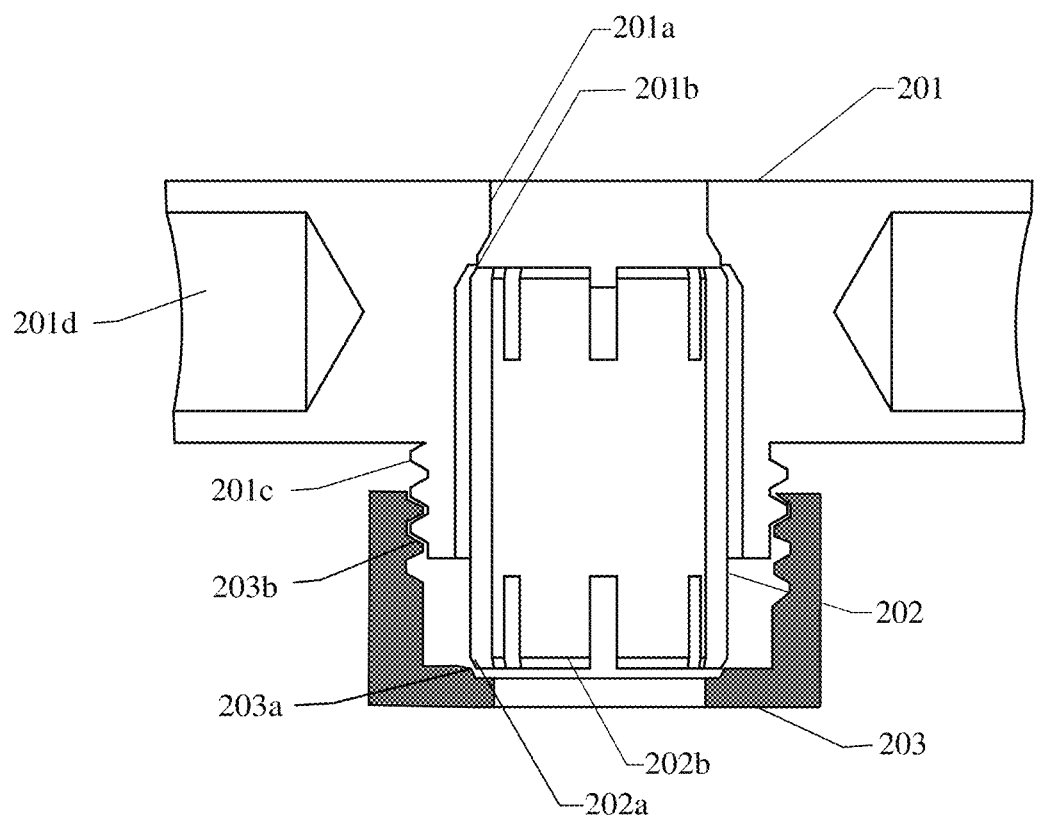
FIG. 4 shows the details of the connector assembly via a sectional view.

FIG. 4 is a cross sectional view of the connector assembly in a preferred embodiment of a threaded joint to illustrate the key features of the invented connector assembly. Feature 201a shows the opening for the stake and 201b is the feature which produces compression of the sleeve 202. Feature 201c is the threaded portion of element 201 which engages with element 203. Feature 201d on this element is the receptacle holes for cross members. Feature 202a on the sleeve shows means to accept compressive forces from either element 201 or 203. The 202a feature and the multitude of slots provide flexibility that, along with contour shape 202b, a rib-like feature, enable the sleeve to grip against the stake or main vertical support member only in the assembled state. Element 203 has Feature 203a, the contour for compressing the sleeve at the other end, and Feature 203b is the internal threads engaging Element 201 at Feature 201c.

The operation of this connector assembly is realized by first inserting one end of the Garden stake 100 in the soil or any substrate containing the plant at a suitable distance from the plant, then sliding element 203 and element 202 from the top of the stake 100 to a desired height. The element 201 is then slid from the top of the stake and a secure connection between element 203 and 201 is made by twisting the element 203, in the process pressing the sleeve against the stake. Then the subsequent vertical supports are similarly placed at a distance to allow cross-member 300 to snugly fit in the receptacle holes in neighboring element 201, multiply placed per plant needs to form a sturdy support structure.

Figure 5:
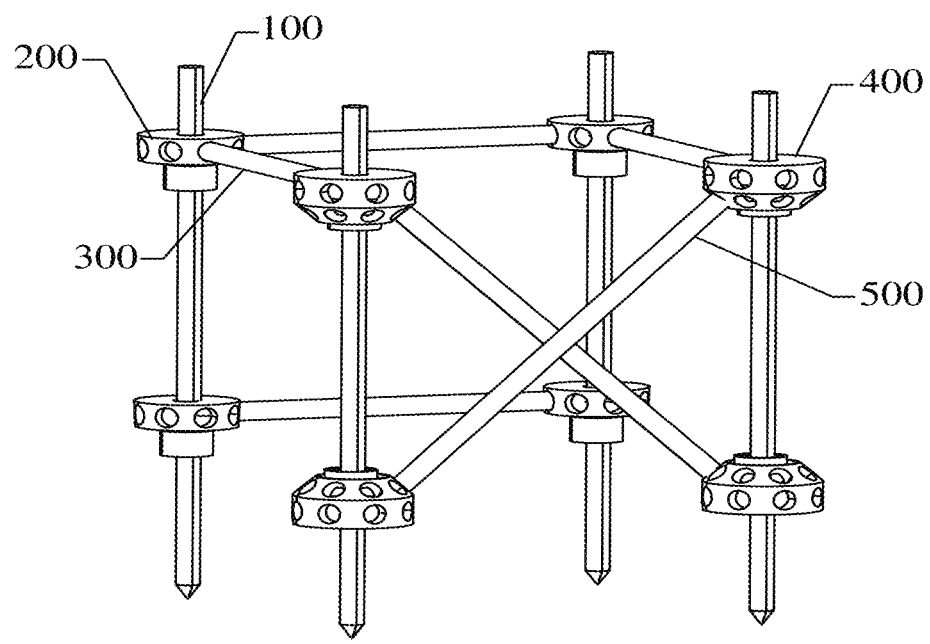
FIG. 5 shows the lattice configuration of the plant support system.

FIG. 5 shows a variant of the connector element with receptacles positioned such that the diagonal cross-members will allow for a lattice structure if the plant benefits from such a support, typically needed for vines. The underlying operation of the assembly remains the same as FIG. 4 with a slight variation; the element 400 now contains a plurality of receptacle holes on a conical surface such that the cross member 500 will be oriented in non-perpendicular orientation to the main vertical support member 100. Cross member 500 can be repurposed standard length stake, oriented differently.

Figure 6:
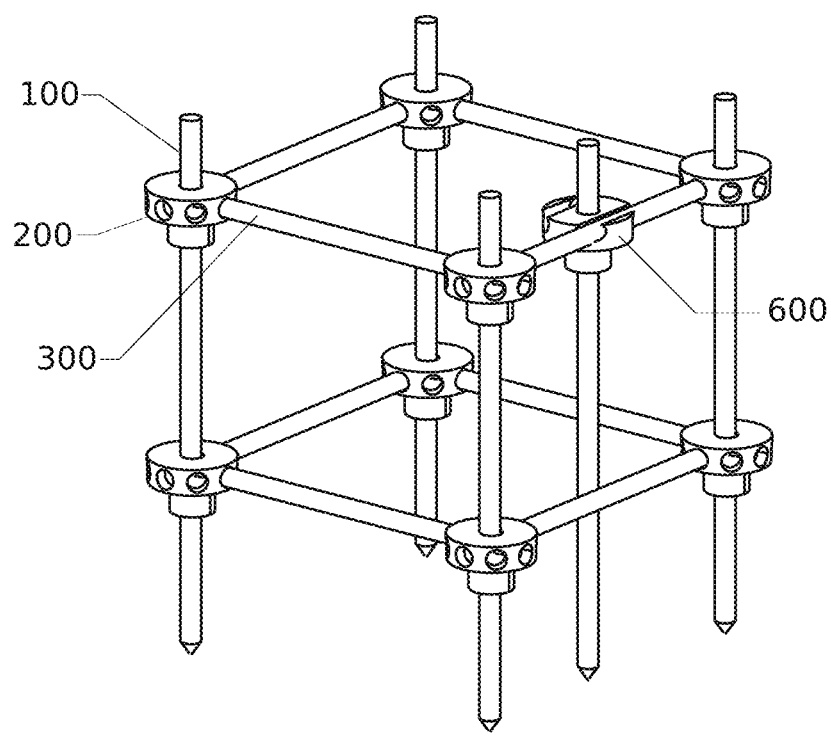
FIG. 6 shows the mid support configuration the connector assembly.

FIG. 6 shows another variation of the top piece of connector assembly where it can serve as a mid support. The common occurrence during a growing season is that heavy fruits cause bowing of the support framework; by just adding an additional stake and a connector element at the right location, this need can be adequately addressed.

Figure 7:
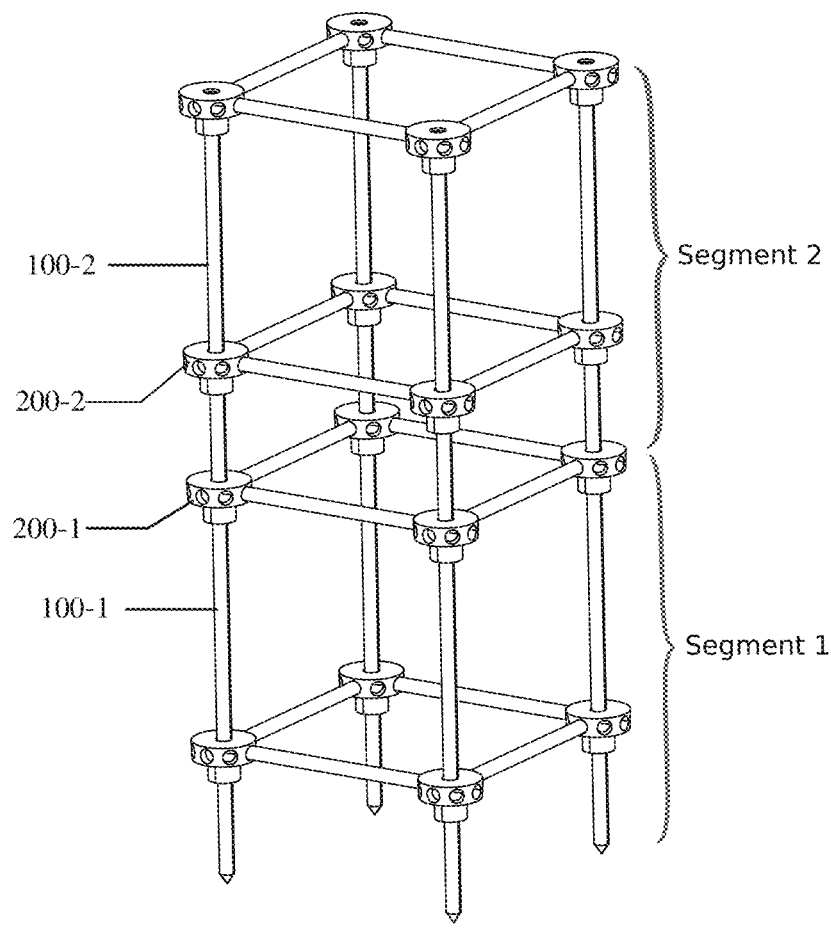
FIG. 7 shows the stacked configuration of the plant support system.

FIG. 7 shows use of the connector assembly, common stakes and previously described method in extending the support system vertically beyond one stake element by stacking multiple segments of these configurations. This ability can be beneficial for appropriate aeration of certain vines and plants.

It will thus be seen that the objects set forth above, apparent from the preceding description and figures, are efficiently attained and, because certain changes may be easily made by those skilled in the art in carrying out the above method and in the construction(s) set forth without departing from the spirit and scope of the invention, it is intended that all matter contained in the above description and shown in the accompanying drawings shall be interpreted as illustrative, and not in a limiting sense.

The invention claimed is:

1. A connector assembly for a plant support structure comprising of:
   a. a hub with a pass through hole at a center thereof configured to allow passage of a support member of the plant support structure, a plurality of receptacles substantially perpendicular to an axis of the central pass through hole configured to receive cross members of the plant support structure, and a first engagement feature at a bottom thereof;
   b. a bottom piece with a pass through hole at a center thereof configured to allow passage of the support member and a second engagement feature to cooperate with said first engagement to secure the hub to the bottom piece;
   c. a compressible sleeve inserted within said holes of said top and bottom pieces and having compressible fingers on a top and bottom end;
   wherein said pass through hole of the hub comprises a sleeve compression feature which produces compression on said top compressible fingers and said pass through hole of the bottom piece has a sleeve compression feature which produces compression on said bottom compressible features which is configured to transmit a gripping radial force against the support member when the bottom piece is tightened with the hub.

2. The connector assembly of claim 1, wherein the top and bottom pieces are engaged via a threaded joint.

3. The connector assembly of claim 1, wherein the top and bottom pieces are engaged via a pin and socket joint.

4. The connector assembly of claim 1, wherein the hub further comprising receptacles at a non-perpendicular angle to the pass through hole of the hub.

5. The connector assembly of claim 1, wherein the plurality of receptacles further comprises at least one partial receptacle configured to be parallel to the ground.

* * * * *